J. E. ERSKINE.
PISTON BEARING.
APPLICATION FILED NOV. 21, 1913.

1,106,702.

Patented Aug. 11, 1914.

WITNESSES
E. M. Callaghan
C. E. Tramor

INVENTOR
JAMES E. ERSKINE,
BY Munn & Co.
ATTORNEYS

UNITED STATES PATENT OFFICE.

JAMES E. ERSKINE, OF LOUISVILLE, KENTUCKY, ASSIGNOR OF ONE-HALF TO ALFRED ISENBERG, OF LOUISVILLE, KENTUCKY.

PISTON-BEARING.

1,106,702.     Specification of Letters Patent.     Patented Aug. 11, 1914.

Application filed November 21, 1913. Serial No. 802,279.

*To all whom it may concern:*

Be it known that I, JAMES E. ERKSKINE, a citizen of the United States, and a resident of Louisville, in the county of Jefferson and State of Kentucky, have made certain new and useful Improvements in Piston-Bearings, of which the following is a specification.

My invention is an improvement in piston bearings, and has for its object to provide a bearing of the character specified, for connecting a piston or plunger with the crank shaft, so arranged as to permit a universal movement of the piston with respect to the rod, and a thorough lubrication of the bearing, and of the piston.

Figure 1:
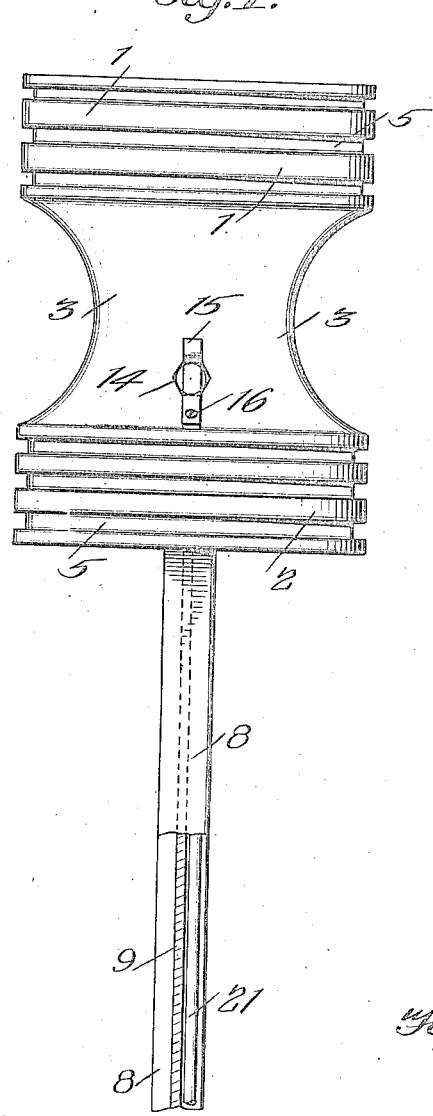
Figure 2:
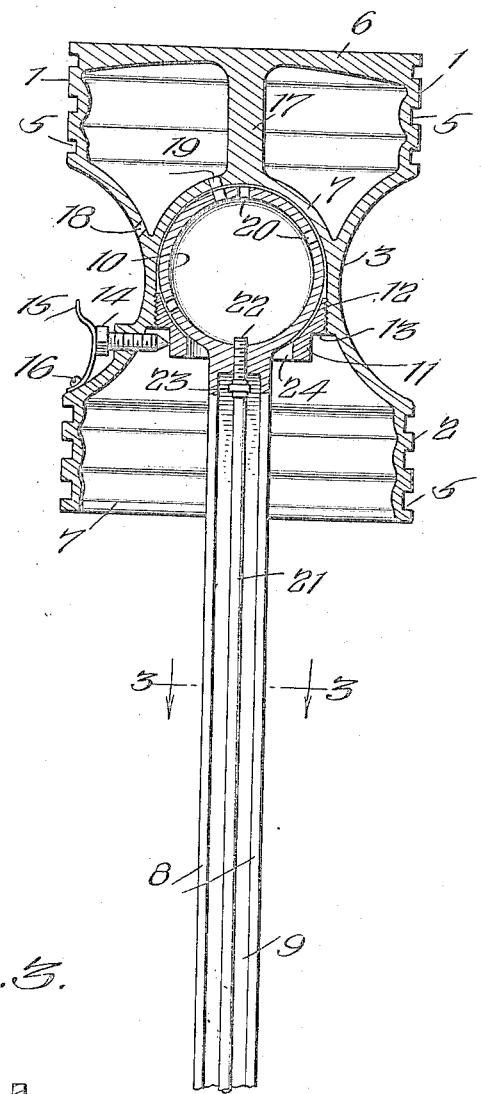
Figure 3:
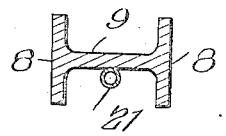

In the drawings: Figure 1 is a side view of a piston provided with the improved bearing, Fig. 2 is a longitudinal section of the piston, and, Fig. 3 is a section on the line 3—3 of Fig. 2.

In the present embodiment of the invention, the piston is a hollow body of approximately cylindrical shape at its ends, as indicated at 1 and 2, and reduced annularly intermediate its ends, as shown at 3.

At each of its ends, the piston is provided with external annular grooves 5, for receiving the usual packing rings, and the outer end of the piston is closed, as shown at 6, the inner end being open, as indicated at 7ª.

At the reduced portion 3 a socket or bearing 7 is provided, of approximately spherical form toward the open end, and that end of the bearing toward the open end of the piston is also open. The piston rod is of H-shape, as shown more particularly in Fig. 3, comprising parallel laterally spaced cross members 8, and a transverse central connecting web 9. At its inner end the said rod is provided with a ball or hollow sphere 10, the said ball or sphere fitting the bearing 7, before mentioned, and a nut 11 is provided for holding the ball in the bearing, the said nut being in the form of a sleeve shaped internally to fit the ball, and threaded externally to engage a threaded portion 12 of the bearing.

It will be noted that the inner end of the nut is reduced to form an annular shoulder 13 facing toward the open end of the piston, and a set screw 14 is threaded through the piston at the reduced portion, for locking the nut from accidental release. The inner end of the set screw engages the nut on the inner side of the shoulder 13, and the said screw is prevented in turn from accidental release, by means of the plate spring 15.

The spring bears intermediate its ends against the head of the set screw, and one end of the spring is secured to the piston by means of a screw 16 or the like. The spring is within the peripheral surface of the piston, so that it does not interfere with the free movement of the piston in the cylinder (not shown). The interior of the piston at the outer end thereof is provided with a transverse web 17, the said web extending from the closed end 6 of the piston to the wall of the bearing 7, and the said web acts to strengthen and reinforce the bearing wall.

It will be noticed that the wall of the piston at the reduced portion 3 is provided with one or more transverse openings 18, leading from the chambered portion or the interior of the piston to the external surface thereof, and other openings 19 are provided leading from the bearing 7 to the said chambered portion of the piston.

The ball or sphere 10 is also provided with openings 20 in its wall, and the said ball is designed to receive a lubricant to thoroughly lubricate not only the bearing surface between the bearing 7 and the ball, but to also lubricate the exterior of the piston, by way of the openings 18 and 19.

Some of the openings 20 are adjacent to the nut 11, opening between the bearing surface of the nut and the exterior of the ball. Lubricant is supplied to the interior of the ball by means of a pipe 21, which may lead from any suitable source of supply, to the interior of the ball. The pipe is connected to a threaded section 22 of pipe engaging the wall of the ball, by means of a union 23, and the pipe is arranged between the cross members 8 of the piston rod, on one face of the web 9.

The opening in the ball is at the junction of the piston rod therewith, and the pipe lies along the adjacent face of the web 9, where it will not interfere with the movement of the piston or rod. That end of the piston rod remote from the ball is connected to the crank shaft in any suitable or desired manner.

It will be evident from the description, that there will be an exceptionally free movement between the piston and the rod, the opening or bore 24 of the lock nut 11 being large enough to permit considerable angular movement of the rod before it will engage the inner surface of the nut. The piston is easily disengaged from the rod when desired, merely by releasing the set screw, until the point thereof no longer engages the shoulder 13. When this is done the nut 11 may be turned out permitting the free withdrawal of the ball.

I claim:

1. In combination, a piston having its ends cylindrical externally and provided with annular packing grooves, and being reduced intermediate its ends, said piston being hollow and having its outer end closed and its inner end open, and having a bearing at approximately its center at the reduced portion, a piston rod having a hollow ball at one end for engaging the bearing of the piston, said bearing being shaped to receive the ball at the open end of the piston and being shaped to fit the ball toward the closed end of the piston, a lock nut of annular form shaped internally to fit the ball and threaded externally, the bearing having a threaded portion toward the open end of the piston for engagement by the nut, said nut having an annular shoulder at the end remote from the bearing, a set screw threaded through the piston at the reduced portion and engaging the shoulder, to lock the nut in place, and a spring engaging the set screw to prevent displacement thereof, the piston wall and the bearing wall having openings, and the ball having openings and being designed to hold a lubricant to lubricate the bearing and the piston through the openings, and means for supplying a lubricant to the ball.

2. In combination, a piston reduced annularly intermediate its eyes and having an internal bearing at the reduced portion, a piston rod provided with a hollow ball fitting the bearing, the piston being internally threaded at the inner end of the bearing and the said bearing being of a diameter at its inner end to permit the insertion and removal of the ball, an annular lock nut engaging the threaded portion of the piston and shaped on its inner surface to fit the ball, said ball being adapted to contain a lubricant, and the ball the bearing wall and the piston wall having openings for permitting the passage of the lubricant from the ball to the exterior thereof and to the interior and exterior of the piston, and means for locking the nut from removal, said means comprising a set screw threaded through the piston at the reduced portion and engaging the nut, a lock for preventing accidental movement of the set screw, and means for supplying a lubricant to the ball.

3. In combination, a piston reduced annularly intermediate its ends and having an internal bearing at the reduced portion, a piston rod provided with a hollow ball fitting the bearing, the piston being internally threaded at the inner end of the bearing and the said bearing being of a diameter at its inner end to permit the insertion and removal of the ball, an annular lock nut engaging the threaded portion of the piston and shaped on its inner surface to fit the ball, said ball being adapted to contain a lubricant, and the ball the bearing wall and the piston wall having openings for permitting the passage of the lubricant from the ball to the exterior thereof and to the interior and exterior of the piston, means for locking the nut from removal, and means for supplying lubricant to the ball.

4. In combination, a piston reduced annularly intermediate its ends and having an internal bearing at the reduced portion, a piston rod provided with a hollow ball fitting the bearing, the piston being internally threaded at the inner end of the bearing and the said bearing being of a diameter at its inner end to permit the insertion and removal of the ball, an annular lock nut engaging the threaded portion of the piston and shaped on its inner surface to fit the ball, said ball being adapted to contain a lubricant, and the ball the bearing wall and the piston wall having openings for permitting the passage of the lubricant from the ball to the exterior thereof and to the interior and exterior of the piston, and means for supplying lubricant to the ball.

5. In combination, a piston reduced annularly intermediate its ends and having an internal bearing at the reduced portion, a piston rod provided with a hollow ball fitting the bearing, means for holding the ball in the bearing, said ball being adapted to contain a lubricant and having openings for permitting the passage of the lubricant from the ball, the bearing wall having openings adapted to register with sundry of the openings of the ball to permit the passage of the lubricant to the interior of the piston, and the piston having openings at the reduced portion to permit the passage of the lubricant to the exterior thereof.

6. In combination, a piston having its inner end open, and having an internal ball bearing intermediate its ends and opening toward the inner end of the piston, a piston having a ball fitting the bearing and adapted to contain a lubricant, and having openings for permitting the passage of the lubricant from the ball, the bearing wall having openings and the piston having openings for permitting the passage of the lubricant, and means for supplying the lubricant to the ball.

7. In combination a piston having one end open and having an integral bearing section within the piston, a piston rod having a ball received in the bearing and a locking ring encircling the rod and having threaded engagement with a piston and forming the other section of the bearing to connect the piston rod to the piston.

JAMES E. ERSKINE.

Witnesses:
  C. E. BOHN,
  A. J. EGELHOFF.